Jan. 30, 1934.  G. F. HOGAN  1,945,112

PHOTOGRAPHIC EQUIPMENT

Filed Feb. 7, 1931  2 Sheets-Sheet 1

INVENTOR
George Francis Hogan
BY
Pennie Davis Marvin & Edmonds
ATTORNEYS

Jan. 30, 1934. G. F. HOGAN 1,945,112
PHOTOGRAPHIC EQUIPMENT
Filed Feb. 7, 1931 2 Sheets-Sheet 2
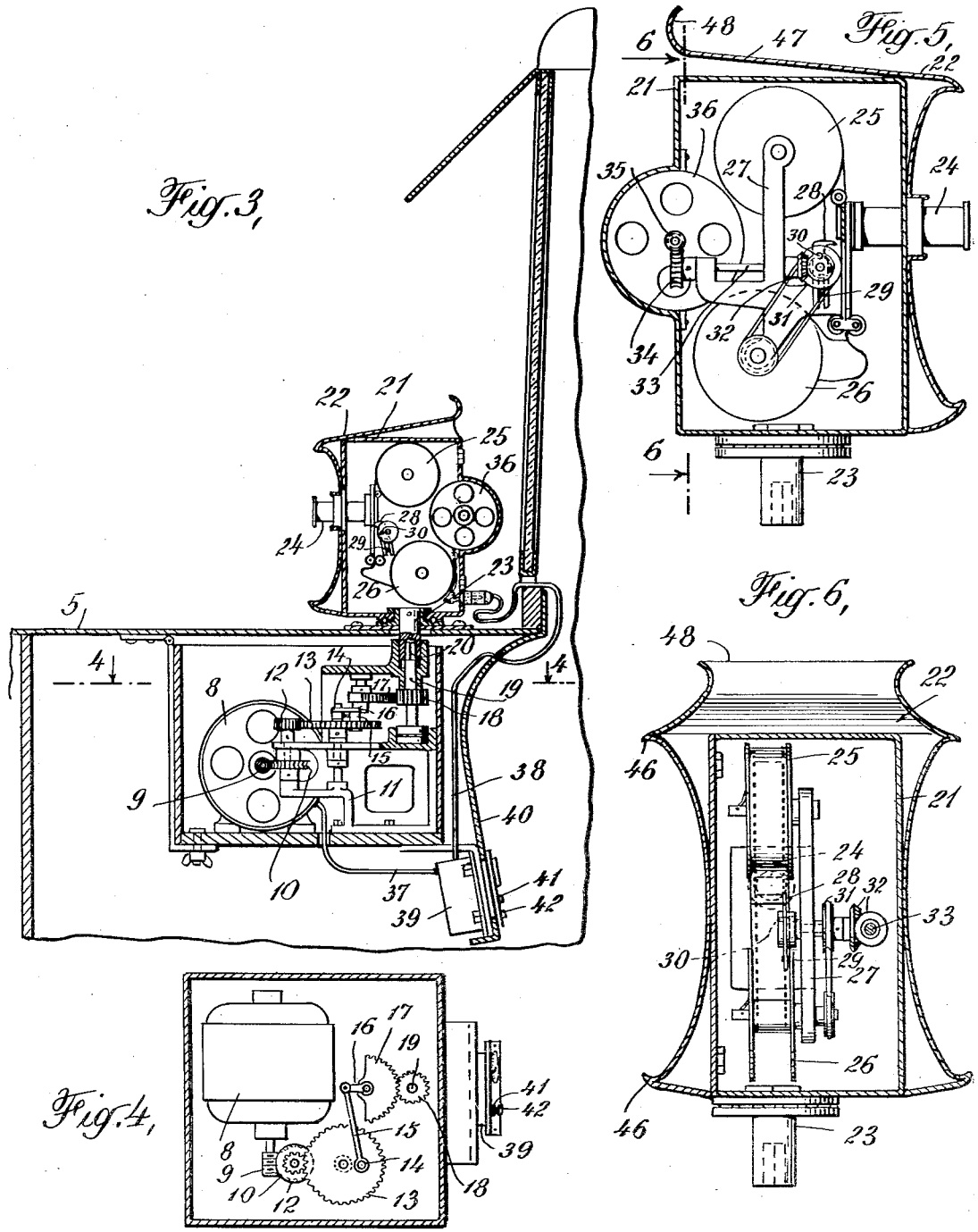

Patented Jan. 30, 1934

1,945,112

UNITED STATES PATENT OFFICE 1,945,112

PHOTOGRAPHIC EQUIPMENT

George Francis Hogan, Chicago, Ill.

Application February 7, 1931. Serial No. 514,130

6 Claims. (Cl. 88—16)

This invention relates to photographic equipment, and more particularly to an apparatus designed to make a photographic record of events occurring in the vicinity of a vehicle such as an automobile. The apparatus is designed more especially for use by the police in recording the scenes of criminal activities and the like.

The police are often handicapped in the matter of identifying individuals who are concerned in criminal activities, particularly where there are a number of individuals, some or all of whom escape from the scene of the crime as the police approach. It is usually difficult to obtain witnesses who will volunteer information. The police are, however, more or less familiar with individuals who are likely to be engaged in criminal enterprises, and a photographic record of those present at the scene of a crime will often enable the police to identify individuals who can then be apprehended readily.

It is the object of the present invention to provide an apparatus whereby a photographic record can be taken from a vehicle such as an automobile, either moving or standing, the apparatus operating preferably automatically so that the movements of the police are not hampered, it being unnecessary to provide an operator for the camera.

Other objects and advantages of the invention will be apparent as it is better understood by reference to the following specification and accompanying drawings, in which Fig. 1 is an elevation of an automobile with the camera in position thereon;

Fig. 3 is a sectional view of a portion of the automobile illustrating the mechanism of the camera;

Fig. 4 is a section on the line 4—4 of Fig. 3;

Fig. 5 is an enlarged sectional view of the camera; and

Fig. 6 is a section on the line 6—6 of Fig. 5.

Figure 1:
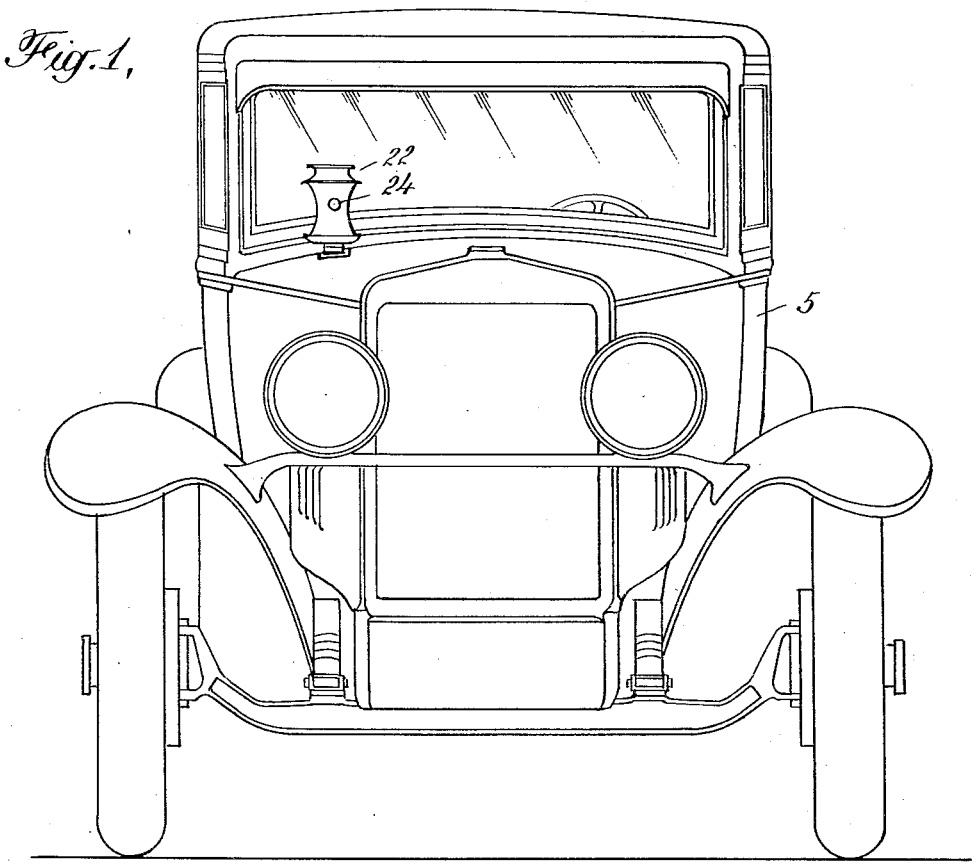
Figure 2:
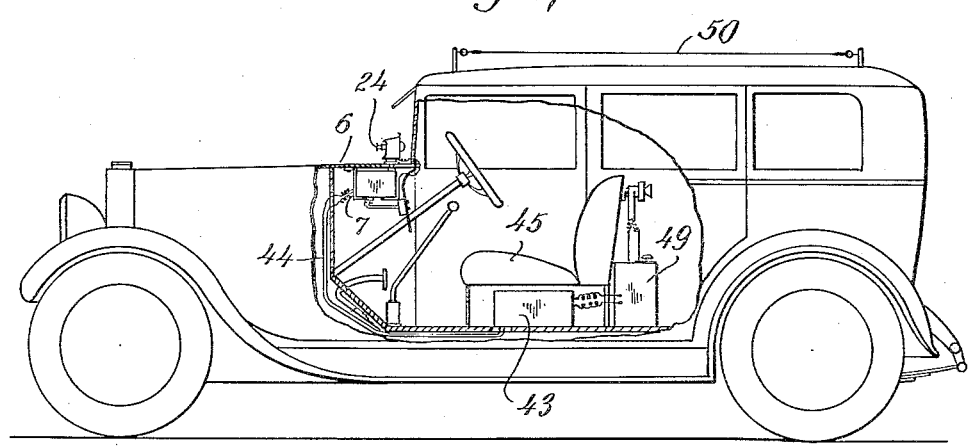
Fig. 2 is a side elevation partially in section of the apparatus and camera equipment.

In carrying out the invention I provide an automobile 5, preferably of the enclosed type. The details of construction of the automobile form no part of the present invention, and further description thereof is, therefore, unnecessary.

Beneath the cowl 6 of the automobile I provide a suitable casing 7 for the driving mechanism of the camera. This comprises a motor 8 having a worm 9 which co-operates with a worm-wheel 10 on a stud shaft supported in suitable bearings in a frame 11. A pinion 12 on the end of the stub shaft meshes with a gear 13 on another stub shaft likewise mounted in the frame 11. A pin 14 on the gear 13 is connected by a link 15 to an arm 16 supported on a stub shaft in the frame 11 carrying a segment 17 which meshes with a pinion 18 on a shaft 19 projecting upwardly and provided with a squared end 20.

Above the cowl 6 I provide a motion picture camera 21 enclosed in a steel casing 22. The latter is provided with a downwardly extending stud 23 which passes through an opening in the cowl of the automobile and is provided with a square recess adapted to co-operate with the squared end 20 of the shaft 19. Thus the motion picture camera is connected to the motor 8 and is adapted to be oscillated thereby when the motor is in operation, the camera swinging through a relatively wide arc substantially equal to 180°.

The motion picture camera may be of any suitable form or construction, and I have illustrated, therefore, merely the general details thereof, it being understood that these details may be modified and that no claim is made herein to any novelty in the camera mechanism per se. The motion picture camera may consist generally of a lens holder 24 extending through the casing 21 and suitable reels 25 and 26 disposed within the casing and mounted on a frame 27 to hold the film which is exposed progressively during the operation of the camera. The film may be fed by any suitable mechanism, as for example by a device 28 slidably mounted on a pin 29 and adapted to be actuated by a pin 30 supported on a rotating member 31 which is in turn driven through a bevel gear 32 and shaft 33 bearing a worm-wheel 34 which co-operates with a worm 35 on the shaft of a motor 36. It will be understood that the motion picture camera operates in the usual manner when the motor 36 is in operation, the film being fed from the roll 25 past the aperture at the end of the lens holder 24, the usual shutter, not shown, being simultaneously operated to ensure the exposure of the successive frames on the film. The film is simultaneously wound on the reel 26.

To effect the operation of the apparatus the motors 8 and 36 are connected through conductors 37 and 38 to a switch box 39 mounted on the instrument board 40 of the vehicle. The switch box may be of any common construction provided, for example, with "on" and "off" buttons 41 and 42 whereby the circuit is closed simultaneously to the motors 8 and 36 and similarly opened when the apparatus is to be stopped. Current may be supplied from a battery 43 in the vehicle through conductors 44 extending to the switch box 39. The details of the electrical circuit involve merely the skill of the ordinary electrician, and therefore are not illustrated.

It will be understood from the foregoing that with the apparatus as described the operator of the vehicle, who may be sitting in the seat 45, need only press the button 41 to start the apparatus in operation. The motor 8 when started will oscillate the camera, and simultaneously the motor 36 will commence to feed the film and to actuate the shutter so that a continuous photographic record is made of the scene adjacent to the vehicle. The camera may be thus actuated while the vehicle is moving, for example as it approaches the scene of the crime or other disturbance so that a record will be made of individuals present who can be identified subsequently therefrom.

To protect the mechanism from stray bullets or those directed particularly in an attempt to disable it, I preferably surround the casing 7 as indicated with a bullet-proof casing 22. This may be made of any suitable hard metal capable of deflecting bullets, for example steel or suitable steel alloys. Preferably the sides of the casing 22 are curved as indicated with outwardly directed flanges 46, the top plate 47 having a curved flange 48. It will be understood that any bullet striking the apparatus will be stopped by the casing 22 and in many cases the bullet will be deflected from the casing by the sloping sides thereof.

The vehicle may be and preferably is equipped with apparatus 49 for broadcasting and receiving messages, and an antenna 50 may be supported on the roof of the vehicle for co-operation with the equipment 49. Thus the police in the vehicle may be advised of developments in connection with crimes and other disturbances and dispatched quickly to the scene thereof.

Various changes may be made in the details of construction and arrangement of the apparatus as herein described without departing from the invention or sacrificing the advantages thereof.

I claim:

1. In a device of the character described, the combination of a base member, a support thereon, a motion picture camera mounted on the support, means for turning the support and camera in one direction, means for automatically reversing the turning means after a predetermined movement in the one direction whereby oscillatory movement is obtained, and means for simultaneously actuating the camera and the turning means to provide a photographic record.

2. In a device of the character described, the combination of a base member, a support thereon, a motion picture camera mounted on the support, means for turning the support and the camera thereon in one direction, means for automatically reversing the turning means after a predetermined movement in the one direction whereby an oscillatory movement is obtained, means for simultaneously actuating the camera and the turning means to provide a photographic record, and means for starting and stopping the turning means and the actuation of the camera.

3. In a device of the character described, the combination of a base member, a support thereon, a motion picture camera mounted on the support, means for turning the support and camera thereon in one direction, means for automatically reversing the turning means after predetermined movement in the one direction whereby an oscillatory movement is obtained, a motor, means connecting the motor to the turning means for actuating the latter, and means for simultaneously actuating the camera and the motor to provide a photographic record.

4. In a device of the character described, the combination of a base member, a support thereon, a motion picture camera mounted on the support, means for turning the support and camera thereon in one direction, means for automatically reversing the turning means after a predetermined movement in one direction whereby an oscillatory movement is obtained, a motor, means mechanically connecting the motor and the turning means for operating the latter, means for simultaneously actuating the camera and the motor to provide a photographic record, and means for starting and stopping the motor and the actuation of the camera.

5. In a device of the character described, the combination of a base member, a support thereon, a motion picture camera mounted on the support, means for turning the support and camera thereon in one direction, means for automatically reversing the turning means after a predetermined movement in one direction whereby an oscillatory movement is obtained, power-actuated means operably connected to the turning means for operation of the latter, means for simultaneously actuating the camera and the turning means to provide a photographic record, and means for simultaneously starting and stopping the turning means and the actuation of the camera.

6. In a device of the character described, the combination of a base member, a support thereon, a motion picture camera mounted on the support, means for turning the support and camera thereon in one direction, means for automatically reversing the turning means after predetermined movement in one direction whereby an oscillatory movement is obtained, an electric motor operably connected to the turning means for operating the latter, an electric motor for operating the camera simultaneously with the oscillations thereof to provide a photographic record, and an electric switch in the circuit of both motors for simultaneously starting and stopping the motors for actuating the turning means and the camera.

GEORGE FRANCIS HOGAN.